United States Patent Office 3,489,724
Patented Jan. 13, 1970

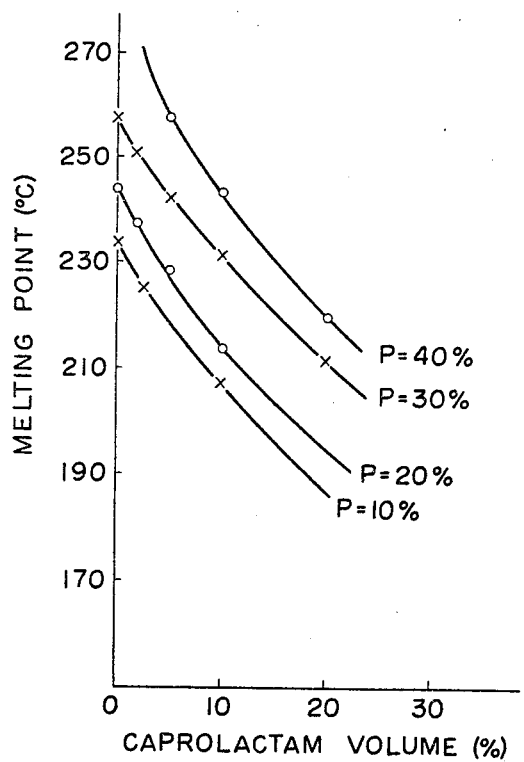

3,489,724
LINEAR COPOLYAMIDES FROM CAPROLACTAM, ADIPIC ACID AND A MIXTURE OF m- AND p-XYLYLENE DIAMINES
Yoshio Iwakura, Tokyo, and Masaki Nakajima and Takeshi Nagaoka, Kitajima, Japan, assignors to Toho Rayon Kabushiki Kaisha, Tokyo, Japan, a Corporation of Japan
Continuation-in-part of application Ser. No. 182,193, Mar. 26, 1962. This application May 17, 1965, Ser. No. 485,133
Claims priority, application Japan, Sept. 29, 1961, 36/35,173
Int. Cl. C08g 20/24
U.S. Cl. 260—78          1 Claim

ABSTRACT OF THE DISCLOSURE

A linear highly polymerized fiber-forming copolyamide consists essentially of a polycondensation product of $\epsilon$-caprolactam and the nylon salt of adipic acid and a mixed meta- and para-xylylene diamine which contains 10–40% by weight of para-isomer. The $\epsilon$-caprolactam is present in an amount at least $0.2P\%$ by weight and less than $0.5P+3.0\%$ by weight respectively of the total weight of all the reactants copolymerized, wherein P represents the content of the para-isomer in percent by weight of the mixed xylylene diamine.

---

This application is a continuation-in-part of applicants' co-pending application Ser. No. 182,193, filed Mar. 26, 1962 and now abandoned.

This invention relates to a method for the manufacture of a linear highly polymerized fiber-forming copolyamide by copolymerizing $\epsilon$-caprolactam with a nylon salt formed from meta-xylylene diamine, para-xylylene diamine and adipic acid, and more particularly to such process wherein $\epsilon$-caprolactam is used in a specified amount so as to suppress thermal decomposition during the polymerization and spinning.

It is known from British Patent 766,927 that a linear superpolyamide of mixed meta- and para-xylylene diamines and an aliphatic dicarboxylic acid of 6 to 10 carbon atoms possesses superior physical properties compared to those of the superpolyamide including meta- or para-xylylene diamine alone, and can be prepared more economically.

The superpolyamide obtained in accordance with this British patent, however, has such poor thermal stability that it is decomposed by heating during polymerization and spinning. The thermal decomposition products cause fatal faults such as discoloration of the polymer and products made therefrom and deterioration of the products.

The first object of this invention is, thus, to avoid and overcome said faults by copolymerizing a particular amount of $\epsilon$-caprolactam with the nylon salt of adipic acid and mixed meta- and para-xylylene diamines.

Another object of this invention is to provide a method for the manufacture of a novel modified copolyamide at lower costs by utilizing mixed meta- and para-xylylene diamines including para-isomer in a range of 10–40% by weight of the total mixed diamine which material is easily available in the petroleum industry.

A further object of this invention is to provide a novel modified copolyamide having excellent spinnability so that efficiency of the production of fibers may be increased and to improve the dyeability to acidic dyes and hygroscopicity of the fibers while maintaining the excellent mechanical properties.

In the manufacture of the superpolyamide prepared from the nylon salt of adipic acid and mixed meta- and para-xylylene diamines which is hereinafter called superpolyamide A, it has been found that when the nylon salt is heated in a nitrogen atmosphere at a temperature above the melting point of the polycondensate, the resulting polycondensate becomes discolored and hard to melt so that the spinnability of the product decreases as the temperature is raised. It has been also found that when thus discolored polycondensate is subjected to hydrolysis with concentrated hydrochloric acid, various decomposition products are yielded such as ammonia, meta- or para-xylylamine, primary and secondary amines of high molecular weight in addition to adipic acid and mixed meta- and para-xylylene diamines. These decomposition products are detected also when the mixed para- and meta-xylylene diamines only are heated to decomposition. It can be concluded from the facts referred to above that said faults are caused by the thermal decomposition of xylylene diamines in the free state contained in the polydensate. We have thus found from said facts and a correlation of the polycondensate character with ammonia yielding amount that the degree of thermal decomposition during polymerization reaction can be easily determined by measuring the amount of ammonia in the water formed during the reaction.

The fact that formation of the decomposition products is increased as the polymerization temperature is raised to affect the adverse influences on the properties of the polymer and products therefrom as referred to above makes it difficult to select desirable conditions for polymerization of superpolyamide A. It is because, when superpolyamide A is to be manufactured through melt polymerization on an industrial scale, proceeding with polymerization at a temperature close to the melting point is rather difficult and the polymerization temperature kept at a temperature above the melting point by at least 20° C. is required in order to prevent the polycondensate from solidifying due to lowering of the temperature of the melted polymer which is caused by excluding water formed by the polycondensation reaction so as to obtain homogeneous polymerization. Furthermore, when it is taken into consideration that the melting point of the polycondensate is 237° C. even when the xylylene diamine consists only of meta-xylylene diamine, which is to be higher when the ratio of the para-isomer to be mixed therewith is increased in order to impart desirable properties to the fibers made therefrom and consequently further higher temperature for polymerization is required, the thermal stability of the polycondensate is to be more important. Finally it is desirable to proceed with the polymerization and spinning at a temperature as high as possible in order to lower the viscosity and thereby realize more homogeneous polymerization and higher spinability so far as it does not affect the adverse influences on the properties of the product, in consideration also of which the thermal stability is serious.

The inventors have succeeded, in polycondensation of adipic acid and mixed meta- and para-xylylene diamines, to surpress the thermal decomposition during polymerization and spinning so as to avoid and overcome the faults as stated hereinbefore and to lower the melting point of the resulting polycondensate so as to exclude the hindrances to the commercial scale production by adding a small amount of ε-caprolactam.

In Table 1, are shown the amounts of ammonia generated during the polycondensation, and the melting point and color of the polycondensate prepared on a laboratory scale from mixed meta- and para-xylylene diamine, adipic acid and ε-caprolactam wherein the amount of para-isomer in the mixed xylylene diamine, the amount of ε-caprolactam to be copolymerized and the reaction temperature were varied.

merization temperature. Thus, the temperatures, despite the requirement that it must be higher than the melting point by at least 20° C. so as to prevent solidification of the polymer, may be such that the thermal decomposition during both polymerization and spinning operations can be avoided, which is quite preferable for commercial production.

It is to be noted that the present invention is of considerable significance for the commercial production in suppressing thermal decomposition during the polymeriza- TABLE 1.—DETERMINATION OF AMMONIA GENERATED FROM POLYCONDENSATION SYSTEM AND COLOR OF RESULTING POLYMER

| Test No. | Composition of Polymer | | Temp. of polycondensation (° C.) | Melting point of polymer (° C.) | Resulting ammonia (mol percent) | Color of polymer |
|---|---|---|---|---|---|---|
| | P (percent) | C (percent) | | | | |
| 1 | 10 | 0 | 260 | 235–239 | 0.22 | Yellow. |
| 2 | 10 | 2 | 260 | 233–238 | 0.14 | Pale yellow. |
| 3 | 10 | 5 | 260 | 223–230 | 0.023 | Colorless. |
| 4 | 10 | 10 | 260 | 208–212 | 0.048 | Do. |
| 5 | 20 | 0 | 260 | 239–245 | 0.25 | Yellow. |
| 6 | 20 | 2 | 260 | 235–240 | 0.10 | Colorless. |
| 7 | 20 | 5 | 260 | 224–230 | 0.045 | Do. |
| 8 | 20 | 10 | 260 | 211–215 | 0.025 | Do. |
| 9 | 20 | 0 | 270 | Infusible | 0.75 | Dark yellow. |
| 10 | 30 | 0 | 265 | 255–258 | 0.25 | Yellow. |
| 11 | 30 | 10 | 265 | 227–234 | 0.071 | Colorless. |
| 12 | 30 | 0 | 270 | Infusible | 0.58 | Dark yellow. |
| 13 | 30 | 2 | 270 | 247–253 | 0.22 | Pale yellow. |
| 14 | 30 | 5 | 270 | 240–245 | 0.10 | Colorless. |
| 15 | 30 | 10 | 270 | 228–234 | 0.12 | Do. |
| 16 | 30 | 20 | 270 | 205–213 | 0.10 | Do. |
| 17 | 30 | 0 | 280 | Infusible | 1.27 | Dark yellow. |
| 18 | 30 | 5 | 280 | 240–246 | 0.33 | Yellow. |
| 19 | 30 | 10 | 280 | 227–234 | 0.25 | Pale yellow. |
| 20 | 30 | 20 | 280 | 205–212 | 0.28 | Do. |
| 21 | 40 | 10 | 270 | 243–245 | 0.10 | Colorless. |
| 22 | 40 | 20 | 270 | 218–224 | 0.13 | Do. |
| 23 | 40 | 0 | 280 | Infusible | 1.35 | Dark yellow. |
| 24 | 40 | 5 | 280 | 256–259 | 0.29 | Pale yellow. |
| 25 | 40 | 10 | 280 | 242–246 | 0.30 | Do. |
| 26 | 40 | 20 | 280 | 218–223 | 0.25 | Do. |
| 27 | 0 | 0 | 260 | 236–238 | 0.18 | Do. |

P: Content of para-isomer in percent by weight of the mixed xylylene diamine as used.
C: Amount of ε-caprolactatm to be copolymerized with the nylon salt of adipic acid and mixed meta-, para-xylylene diamine, in percent by weight of the all reactants.

The accompanying drawing shows the relation between the melting point of the resulting polycondensate and the amount of ε-caprolactam to be added in percent by weight of the all reactants to be copolymerized wherein the ratio of para-isomer in the mixed meta- and para-xylylene diamine is varied.

As seen from Table 1 and the drawing, the melting point of the resulting polycondensate increases with an increase in the amount of the para-isomer, while it decreases when ε-caprolactam is added, depending on the increase of the amount thereof to be added. This means that in respect of superpolyamide A, i.e. when ε-caprolactam is not added, the temperature for polymerization must be raised depending on the increase of the melting point. When the polymerization temperature is raised, the amount of ammonia generated during the polymerization is increased which causes discoloration of the polymer. When the amount of ammonia reaches 0.5 mol percent, the polymer is gel-like. In this case it is impossible not only to determine the melting point due to the impossibility of dissolution with any solvent but also to spin the polymer on an industrial scale.

When ε-caprolactam decreases it is clear from said table and drawing that the amount of generated ammonia and the degree of discoloration is lowered which means that the formation of decomposition products during the reaction has been suppressed. While it will be noted that when the temperature is extremely raised, even if ε-caprolactam is copolymerized, sufficient suppression of the thermal decomposition is difficult and consequently the product is slightly discolored as shown in the table.

However, since the addition of ε-caprolactam concurrently lowers the melting point of the polycondensate there is no need for adopting such extremely high polytion reaction so as to prevent its undesirable influences on the polymer and the products made therefrom, in particular fibers, and concurrently lowering the melting point of the polycondensate so as to make it easy to select the polymerization temperature regardless of the content of the para-isomer in the mixed xylylene diamine, by copolymerizing a small amount of ε-caprolactam.

The amount of ε-caprolactam to be added in this invention is of at least 2% by weight of all the reactants to be copolymerized.

The range of the polymerizing temperature is preferably higher than the melting point by at least 20° C. and lower than 280° C., and more preferably is 250–275° C. so far as higher than the melting point by at least 20° C.

Further preferable features of the present invention and desirable conditions therefor shall be set forth hereinafter.

The novel copolyamide produced in accordance with the present invention has improved spinnability as seen in Table 2, below which shows test results obtained by melt spinning at a temperature above 270° C. of various copolyamides from the mixed xylylene diamine, adipic acid and ε-caprolactam in which the amounts of para-isomer in the mixed xylylene diamine and of caprolactam were varied. The melt spinning was carried out in a melter equipped with a cylinder heated with a Dowtherm into which polymer chips were charged, and after heating at a temperature above the melting point for 1 hour, the resulting molten polymer was discharged under nitrogen pressure of 5 kg./cm.$^2$ through a spinneret from the bottom of the cylinder at a velocity such that the total amount of polymer in said cylinder was exhausted in 2 hours. The formed filaments were taken up and stretched to 4–5 times their original length. The spinnability is expressed by "Conversion of Polymer Chips into Filaments" (CPF) which is readily calculated from the following equation:

$$CPF = \frac{\text{Filament (gm.) obtained until winding-up has been impossible due to break caused by foaming and containing of decomposed materials}}{\text{Polymer chips (gm.) as charged}} \times 100$$

TABLE 2.—RELATION BETWEEN COMPOSITION OF POLYMER AND SPINNABILITY

| Test No. | Composition of polymer | | Intrinsic viscosity ($\eta$) | Temp. of spinning (° C.) | C.P.F. (percent) |
|---|---|---|---|---|---|
| | P (percent) | C (percent) | | | |
| 1 | 40 | 5 | 0.89 | 275 | 60 |
| 2 | 40 | 10 | 0.89 | 275 | 85 |
| 3 | 30 | 0 | 0.82 | 280 | 25 |
| 4 | 30 | 0 | 0.86 | 275 | 20 |
| 5 | 30 | 5 | 0.90 | 275 | 65 |
| 6 | 30 | 10 | 0.90 | 270 | 85 |
| 7 | 30 | 20 | 0.92 | 270 | 85 |
| 8 | 20 | 0 | 0.97 | 275 | 35 |
| 9 | 20 | 2 | 0.90 | 270 | 70 |
| 10 | 20 | 5 | 8.89 | 270 | 80 |
| 11 | 20 | 10 | 0.91 | 270 | 85 |
| 12 | 10 | 0 | 0.90 | 270 | 55 |
| 13 | 10 | 3 | 0.95 | 270 | 80 |
| 14 | 0 | 100 | 1.00 | 270 | 85 |

It will be clear that the CPF of the copolyamide of the present invention shows higher values as compared with that of superpolyamide A, and that said copolyamide is proved to have good spinnability compared with that of polycaproamide (nylon-6). Although the polymer in which no caprolactam is copolymerized, namely superpolyamide A, may form filaments fairly smoothly in the initial stage of the spinning operation, it cannot be converted into filaments with a sufficient value of CPF. A considerable amount of the polymer chips charged are left undischarged in the cylinder due to lowering of the spinnability caused by the thermal decomposition and deficiency of fluidity of the polymer.

The spinning operation is preferably carried out at a temperature of at least 265° C. and not exceeding 280° C. in order to prevent discoloration due to the thermal decomposition and concurrently to lower the viscosity of the polymer so as to improve the spinnability.

As referred to above, $\epsilon$-caprolactam is added in an amount of at least 2% in order to suppress the thermal decomposition, while from the viewpoint of improving fluidity, stability and spinnability of the polymer to be spun out it has been found more preferable to control the amount of $\epsilon$-caprolactam to be copolymerized with the nylon salt to at least 0.2P weight percent of the total weight of the all reactants to be copolymerized wherein P represents the content of the para-isomer in percent by weight of the mixed xylylene diamine which is commercially available as referred to above.

The properties of the fibers spun from the polymers which were prepared with varying the amount of $\epsilon$-caprolactam and the content of the para-isomer in the mixed xylylene diamine are shown in Table 3 below.

It will be seen from Table 3 that some of the fibers from the above copolyamide have rather inferior mechanical properties depending upon the $\epsilon$-caprolactam content, although they have higher moisture regain and dyeability over those of the fibers from superpolyamide A.

It is, however, to be noted that fibers having not only excellent mechanical properties but also superior moisture-absorbability and dyeability can be obtained when a particular ratio of $\epsilon$-caprolactam is used depending on the amount of para-isomer in the mixed xylylene diamine. For instance, when 10% by weight of $\epsilon$-caprolactam is polycondensed together with the nylon salt of meta-, para-xylylene diamine and adipic acid, an excessive depression of Young's modulus results in the case of P=10% but it was not so considerably influenced in the case of P=30%. Thus, in order to obtain fibers well suited for textile use, the amount of $\epsilon$-caprolactam to be used may be determined according to the para-isomer content in the mixed xylylene diamine used. It has been found that the amount of $\epsilon$-caprolactam to be copolymerized is preferably less than (0.5P+3.0) weight percent of the total weight of all the reactants to be copolymerized wherein the symbol P has the same meaning as given above.

If the amount of $\epsilon$-caprolactam to be copolymerized is excessively increased relative to that of the nylon salt, the melting point and Young's modulus of the resulting polymer are lowered and the structure of the formed fibers is amorphous. When $\epsilon$-caprolactam is used in an amount such as satisfies the condition referred to above, a copolyamide having a melting point above about 210° C. is easily prepared. The copolyamide may be spun into fibers without causing any technical difficulty which fibers possess excellent properties such as high sticking temperature, high moisture regain and good dyeability to acid dyes while maintaining excellent mechanical properties.

The copolyamide may be advantageously prepared by the polycondensation of the nylon salt of meta-, para-xylylene diamine and adipic acid together with $\epsilon$-caprolactam in an autoclave. The nylon salt may be prepared by pouring an aqueous solution of the mixed xylylene diamine and an equivalent amount of adipic acid into a lower alcohol such as methanol, ethanol or isopropanol to thereby be crystallized, and filtrated. The polycondensation may also be carried out as follows. Instead of crystallization, the equivalent ratio of the mixed xylylene diamine and adipic acid is controlled by pH determination or conductometric titration and the regulated nylon salt solution is, either in situ or after being concentrated, placed in an autoclave to react with $\epsilon$-caprolactam.

The mixture of reactants is heated at a temperature of 170–230° C. and under a steam pressure of 10–20 kg./cm.$^2$ for several hours in a closed vessel to obtain a lower molecular weight polymer which is then heated to a higher temperature. Water which is produced by the polycondensation is discharged and the pressure in the autoclave is lowered to atmospheric pressure. At this stage TABLE 3.—PROPERTIES OF FIBERS FROM COPOLYAMIDE OF THIS INVENTION AND SUPERPOLYAMIDE A

| Test No. | Composition of polymer | | Tensile strength (g./d.) | Elongation (percent) | Young's modulus (g./d.) | Moisture regain [1] (percent) | Acidic dye exhaustion [2] (percent) |
|---|---|---|---|---|---|---|---|
| | P (percent) | C (percent) | | | | | |
| 1 | 40 | 10 | 4.01 | 45.0 | 42.3 | 3.25 | 40.3 |
| 2 | 40 | 20 | 3.65 | 40.5 | 26.3 | 3.80 | 62.9 |
| 3 | 30 | 0 | 3.48 | 59.3 | 50.4 | 2.57 | 29.2 |
| 4 | 30 | 5 | 4.30 | 31.8 | 54.0 | 3.80 | 47.6 |
| 5 | 30 | 10 | 2.80 | 62.9 | 32.6 | 3.53 | 49.0 |
| 6 | 30 | 20 | 2.59 | 43.1 | 15.3 | 3.91 | 45.0 |
| 7 | 20 | 0 | 4.06 | 44.9 | 59.4 | 3.48 | 43.2 |
| 8 | 20 | 5 | 2.67 | 46.8 | 29.5 | 3.52 | 53.3 |
| 9 | 20 | 10 | 2.07 | 43.4 | 14.3 | 3.55 | 67.0 |
| 10 | 10 | 0 | 3.45 | 49.7 | 56.7 | 3.54 | 60.0 |
| 11 | 10 | 5 | 3.10 | 41.0 | 47.4 | 3.23 | 59.1 |
| 12 | 10 | 10 | 1.89 | 72.3 | 16.3 | 3.89 | 68.3 |
| 13 | 0 | 0 | 3.12 | 36.7 | 51.8 | 3.45 | 48.7 |
| 14 | 0 | 100 | 4.00 | 36.0 | 12.3 | 4.01 | 83.2 |

[1] 65% relative humidity, 20° C.
[2] Acid brill. scarlet 3R 2% by weight of fiber, 100° C., 1 hour.

the reaction temperature must be kept higher than the melting point of the final polymer product at least by 20° C. If a higher molecular weight polymer is desired, further heating at a reduced pressure of 200–0.5 mm. Hg is necessary. The molten high polymer is then discharged from the autoclave by applying a nitrogen pressure. The resulting ribbon is cooled in ice water, disintegrated and dried.

Spinning of this polymer is easily carried out by an ordinary melt-spinning apparatus, and the filament formed is drawn up to 4 to 5 times its original length by the usual method.

The present invention will be explained in more detail in the following examples. It is, however, to be noted that the examples are for the purpose of illustration and are not given with the intention of limiting the invention thereby.

EXAMPLE 1

In an autoclave of stainless steel, 20 gm. of $\epsilon$-caprolactam and 180 gm. of a nylon salt comprised of equivalent amounts of adipic acid and mixed meta- and para-xylylene diamine containing 30% by weight of para-isomer were charged together with 0.20 gm. adipic acid as a stabilizer. After the air in the autoclave was displaced with nitrogen, it was closed and heated at 220° C. for 5 hours. The temperature was then raised to 260° C. in 1 hour, and the pressure of the system was 20–25 kg./cm.$^2$. The pressure was then gradually reduced to atmospheric. Water formed by the polycondensation reaction was quantitatively collected in standard N/10 sulfuric acid solution. Further heating at 260° C. for 2 hours under atmospheric pressure, it was finally heated for 30 min. at 260° C. under a vacuum of 100 mm. Hg.

The resulting molten high polymer was discharged from the bottom of the autoclave by applying a nitrogen pressure of 0.3–0.5 kg./cm.$^2$, and a ribbon was collected. The polymer obtained was substantially colorless and had a melting point of 227–230° C., and the intrinsic viscosity measured in m-cresol at 30° C. was 0.89.

A basic compound resulting from the polycondensation system was determined by a titration of N/10 sulfuric acid solution with standard solution of sodium hydroxide using methyl orange as an indicator. It was proved that 92.5% of this basic compound was ammonia and that the amount of ammonia was 0.061 mol percent based on meta-, para-mixed diamine used.

The ribbon-like polymer was cut into chips and dried in an oven at 100–110° C., and 30 gm. of which was charged into a small scale melter equipped with a Dowtherm heated cylinder. After it was heated at 275° C. for 1 hour in a nitrogen atmosphere, the molten polymer was extruded through the spinneret by a nitrogen pressure of 5–6 kg./cm.$^2$. The filament was smoothly wound at a constant rate on a bobbin. Over a period of 1 hour, a uniform filament of 25.5 g. was obtained without interruption. "Conversion of polymer chips into filaments" (CPF) was 85%.

The fibers obtained after drawing same to 4.7 times its initial length showed a high orientation along the major axis according to X-ray diffraction. It showed the following properties; tensile strength of 2.8 gm./denier, elongation of 62.9%, Young's modulus of 32.6 gm./d., moisture regain (65% relative humidity, 20° C.) of 3.53%, acid dyes exhaustion of 49% (Acid Brill. Scarlet 3N, 2% weight of fiber, 100° C. 1 hour).

On the oher hand, polycondensation of the mixed nylon salt used above (P=30%) was carried out without the addition of $\epsilon$-caprolactam under the same condition, but the temperature, at which the reduction of pressure and the subsequent vacuum heating was effected, was kept at 285° C. In this case, the amount of ammonia resulting from the polycondensation system was 1.73 mol percent. The polymer thus obtained was discolored and, moreover, it contained many fine gaseous bubbles and it proved to be impossible to convert it into filaments.

EXAMPLE 2

A copolyamide was prepared from 10 gm. of $\epsilon$-caprolactam and 190 gm. of nylon salt comprised of equivalent amounts of adipic acid and mixed meta- and para-xylylene diamine containing 10% by weight of para-isomer under the same condition as in Example 1. The resulting polymer was colorless and had a melting point of 223–225° C. and an intrinsic viscosity of 0.92. Ammonia resulting from the polycondensation process was only 0.031 mol percent based on the mixed xylylene diamine used. It was melt-spun (CPF=83%) and drawn up to 4.5 times its initial length. The fibers thus obtained had the following properties, tensile strength 3.1 gm./denier, elongation 41% Young's modulus 47.4 gm./d., moisture regain 3.23, acid dye exhaustion 59.1%.

EXAMPLE 3

136 g. of mixed xylene diamine containing 20% by weight of para-xylylene diamine was dissolved in 846 g. of distilled water. Into the solution, adipic acid (about 146 g.) equivalent to the diamine was regulatedly added. The adjusted solution had at a temperature of 20° C. a specific gravity of 1.07 and pH value of 7.19. 760 g. of 25% aqueous solution of the nylon salt was introduced into an autoclave together with 10 g. of $\epsilon$-caprolactam and 0.2 g. of adipic acid as a stabilizing agent. After distilling off 400 g. of water, the reactants were heated under pressure at a temperature of 200° C. for 3 hours. Then the temperature was raised to 270° C. and the pressure progressively lowered to atmospheric, and further, heating at a temperature of 270° C. was continued at atmospheric pressure for 1.5 hours. The polymer melt in the autoclave was extruded to form chips. The polymer was colorless, M.P. 225–229° C. and the intrinsic viscosity 0.83. The amount of generated ammonia was 0.11 mol percent of that of the mixed xylylene diamine used. Melt-spinning was carried out at a temperature of 275° C. and the spun product drawn up to 4.3 times its original length. Thus obtained fibers had the following properties; tensile strength of 3.31 gm./denier, elongation of 44.5%, Young's modulus of 45.3 gm./denier, moisture regain of 3.51% and acid dye exhaustion of 50.3%.

We claim:
1. A linear highly polymerized fiber-forming copolyamide consisting essentially of a polycondensation product of $\epsilon$-caprolactam and the nylon salt of adipic acid and a mixed meta- and para-xylylene diamine which contains 10–40% by weight of para-isomer, said $\epsilon$-caprolactam being present in the amount at least 0.2P% by weight and less than 0.5P+3.0% by weight respectively of the total weight of all the reactants copolymerized, wherein P represents the content of the para-isomer in percent by weight of the mixed xylylene diamine.

References Cited

UNITED STATES PATENTS

| | | | |
|---|---|---|---|
| 2,252,555 | 8/1941 | Carothers | 260—78 |
| 2,374,576 | 4/1945 | Brubaker | 260—78 |
| 2,733,230 | 1/1956 | Ufer | 260—78 |
| 2,985,627 | 5/1961 | Caldwell et al. | 260—78 |
| 3,259,606 | 7/1966 | Okada | 260—78 |
| 3,386,964 | 6/1968 | Twilley | 260—78 |

FOREIGN PATENTS

| | | |
|---|---|---|
| 766,927 | 1/1957 | Great Britain. |
| 989,265 | 4/1965 | Great Britain. |

HAROLD D. ANDERSON, Primary Examiner

U.S. Cl. X.R.

260—33.4. 55